Figure 5:
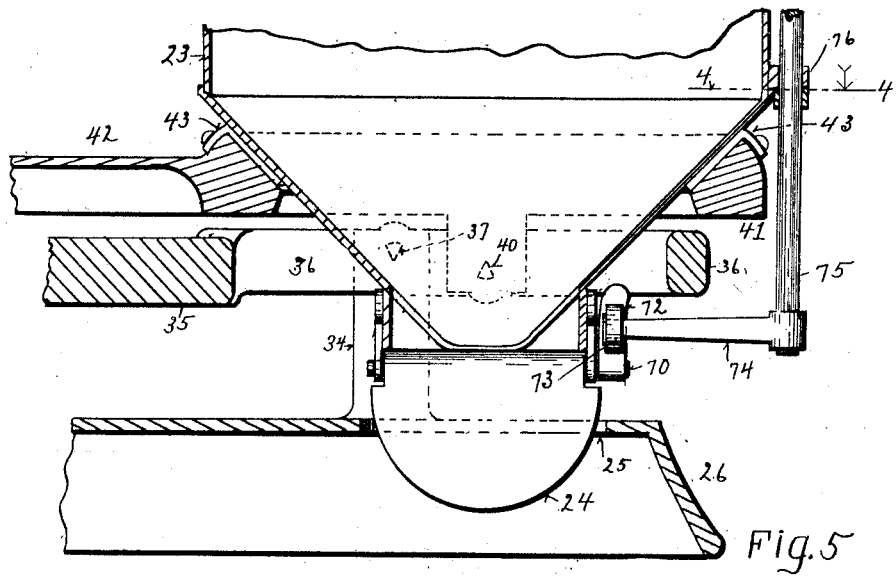

C. D. SCOTT.
AUTOMATIC WEIGHING MACHINE.
APPLICATION FILED NOV. 30, 1917.
1,279,021.
Patented Sept. 17, 1918.
5 SHEETS—SHEET 1.
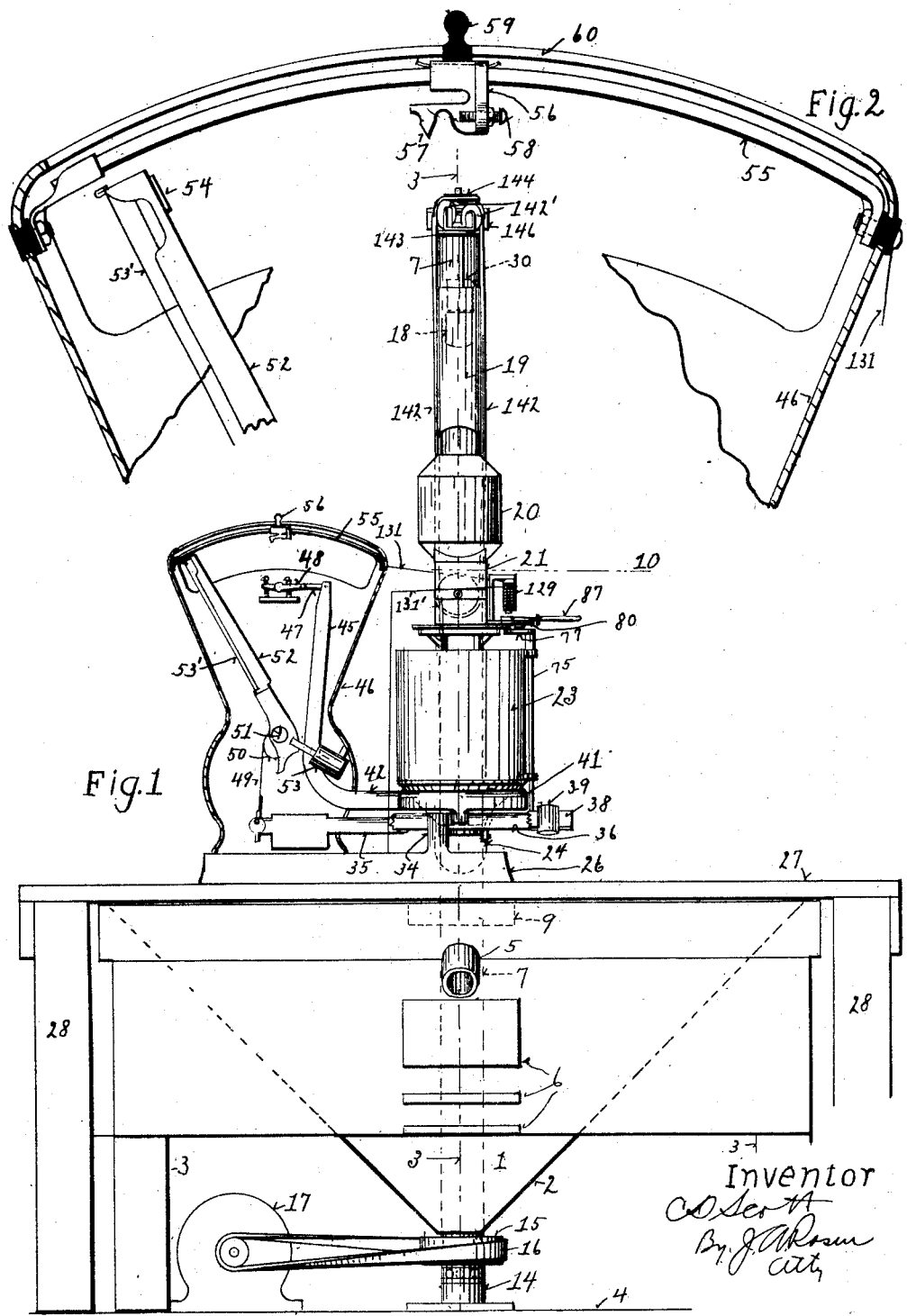

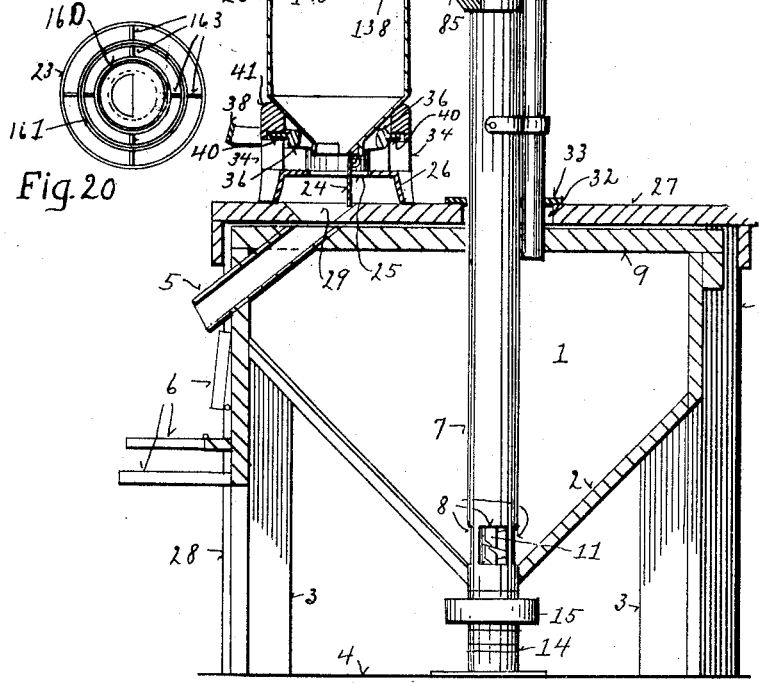

C. D. SCOTT.
AUTOMATIC WEIGHING MACHINE.
APPLICATION FILED NOV. 30, 1917.

1,279,021.

Patented Sept. 17, 1918.
5 SHEETS—SHEET 3.

Inventor

C. D. SCOTT.
AUTOMATIC WEIGHING MACHINE.
APPLICATION FILED NOV. 30, 1917.
1,279,021.
Patented Sept. 17, 1918.
5 SHEETS—SHEET 4.
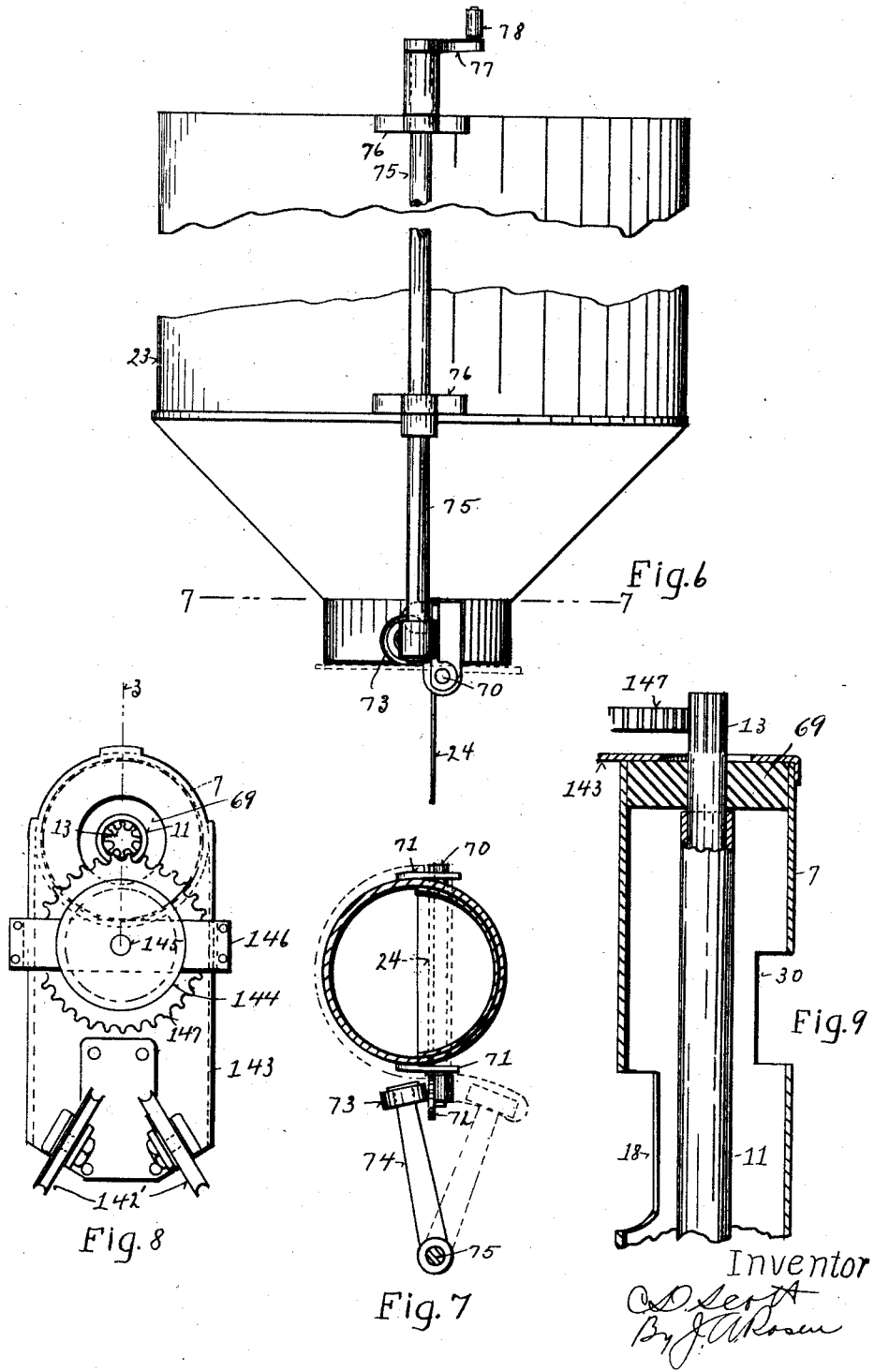

C. D. SCOTT.
AUTOMATIC WEIGHING MACHINE.
APPLICATION FILED NOV. 30, 1917.
1,279,021.
Patented Sept. 17, 1918.
5 SHEETS—SHEET 5.
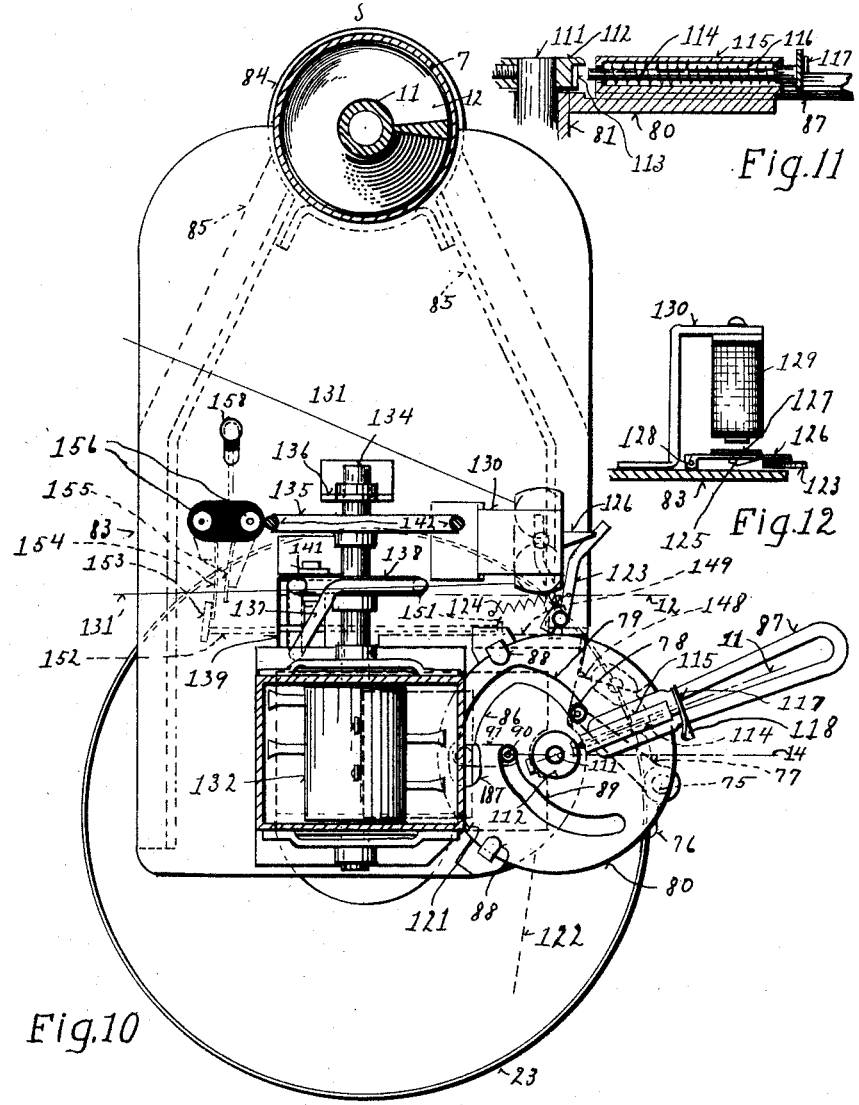
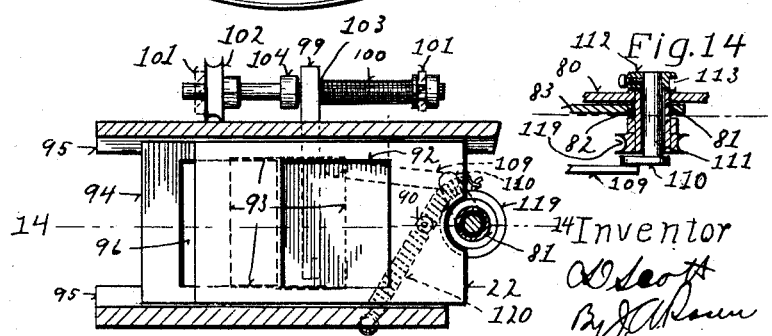

UNITED STATES PATENT OFFICE.

CHARLES D. SCOTT, OF TOPEKA, KANSAS.

AUTOMATIC WEIGHING-MACHINE.

1,279,021.      Specification of Letters Patent.    Patented Sept. 17, 1918.

Application filed November 30, 1917. Serial No. 204,551.

*To all whom it may concern:*

Be it known that I, CHARLES D. SCOTT, a citizen of the United States, residing at Topeka, in the county of Shawnee and State of Kansas, have invented certain new and useful Improvements in Automatic Weighing-Machines, of which the following is a specification.

This invention relates to automatic weighing machines of the general type shown in Patent No. 1,087,838, granted to me February 17, 1914; this type being particularly designed for the retailer, and this particular machine being especially adapted for weighing sugar. The present invention has for its objects the adaptation of the principal elements shown in my former patent to the ordinary type of computing scale; also the production of a more efficient, simpler, and neater element for elevating the sugar from the bin to the hopper above the weighing receptacle; also the production of a simpler, better and more efficient shutter for the bottom of the weighing receptacle; also the production of an improved shutter for the hopper, including an auxiliary shutter for releasing a larger stream of sugar from the hopper into the weighing receptacle; also the improvement and simplification of certain parts relating to the operation of the shutters; all as will be hereinafter set forth and claimed.

In the drawings accompanying and forming part of this specification and in the description of the drawings, I have shown my invention in its preferred form and what I deem to be the best mode of applying the principles thereof; and it is to be understood that, within the scope of the appended claims, I contemplate changes in form, proportions, and materials, the transposition of parts, and the substitution of equivalent members, without departing from the spirit of my invention.

Figure 4:
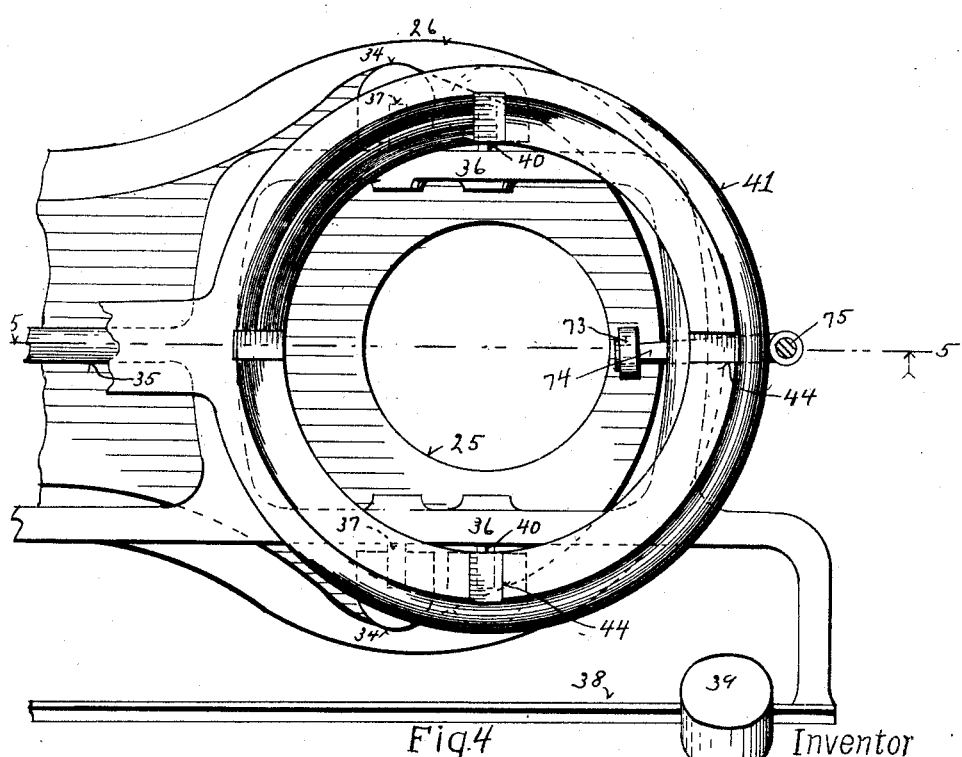

Figure 1 is a front elevation of the complete invention, part of the scale being broken away and part of the frame inclosing and supporting the computing elements in the ordinary type of computing scale being shown in section. Fig. 2 is an enlargement of the parts shown in Fig. 1 relating to the means for making an electrical contact between the indicating lever of the weighing element and an indicator adapted to be set manually so as to obtain in the weighing receptacle the weight of sugar desired. Fig. 3 is a transverse sectional elevation approximately on a plane indicated by the line 3 in Fig. 1. Much of the detail relating especially to the shutter operating mechanism, is not shown in Figs. 1 and 3, these figures being necessarily on a small scale. Figs. 4 and 5 show the parts of the computing scale remodeled especially for this machine, on an enlarged scale; Fig. 4 being a plan view, with a portion of the shutter-closing element, in a line indicated by 4—4 in Fig. 5; and Fig. 5 is a sectional elevation on a plane indicated approximately by the line 5—5 in Fig. 4, the lower portion of the weighing receptacle being shown in this view. Fig. 6 is an elevation of the weighing receptacle, the middle portion being broken away. Fig. 7 is a sectional plan view on a plane indicated by the line 7—7 in Fig. 6. Fig. 8 is a top plan view of the elevator tube with the transmission elements. Fig. 9 is a sectional elevation of the upper end of the elevator tube, in a plane indicated by the line 3 in Fig. 8. Fig. 10 is a sectional plan view, approximately on a plane indicated by the line 10 in Fig. 1, showing details of the hopper and shutter-operating mechanisms. Fig. 11 is a detail of a certain latch on a plane indicated by the line 11 in Fig. 10. Fig. 12 is a detail of the magnetic release, on a plane indicated by the line 12 in Fig. 10. Fig. 13 is a sectional plan view of the hopper shutters and certain associated parts, on a plane indicated approximately by the line 13—13 in Fig. 15. Fig. 14 is a detail in vertical section on a plane indicated by the line 14 in Fig. 10 and Fig. 13 of the pivot element for supporting the operating and controlling handle. Fig. 15 is a vertical sectional elevation on the same plane of the hopper and hopper shutters and certain associated parts. Fig. 16 is a sectional elevation of certain parts on a plane indicated by the line 16 in Fig. 15. Fig. 17 is a detail sectional elevation of the auxiliary shutter on a plane indicated by the line 17 in Fig. 16. Fig. 18 is a view of one of the two split-nut members. Fig. 19 is a bottom view of the elements relating especially to the circuit-breaker for automatically controlling,—stopping and starting,—the driving motor. Fig. 20 is a plan of a modified form of weighing receptacle. Fig. 21 is a vertical central sectional elevation of the same.

Similar reference characters indicate like or corresponding parts throughout the several views.

A bin 1 is made with a hopper-like bottom 2 and is supported by its sides or legs 3, 3 on the floor or platform 4. A spout 5 leads down through the upper front corner, and immediately under the end of the spout are a number of hinged bag supports 6, 6, 6, to accommodate bags of different heights in position where the sugar will flow from the spout into the bag.

7 is an elevator tube set vertically in the center of the bin and formed with a number of holes 8, 8 through which the sugar in the bin will flow into the interior of the pipe. The tube is secured rigidly to the bottom of the bin and is braced by means of a brace 9 extending across the top of the bin. Within the tube is a spiral conveyer element of special construction 10. The small pipe 11 forms the core to which is attached the continuous spiral blade 12. In constructing this conveyer, special attention is given to the flights of this spiral. If the incline is too great, the sugar will run back down into the bin whenever the conveyer stops; and I find that by making the spiral with its outer periphery inclined at an angle of approximately 12 to 15 degrees to the horizontal, the sugar will be readily conveyed upward and will not run back. Also the periphery is spaced apart slightly from the inner surface of the tube wall, so that no grains of sugar will be crushed therebetween. In the upper end of the core pipe is a bearing spindle formed with a pinion 13 and having its bearing in the block 69. The lower end of the core pipe is suitably supported on ball bearings 14 and carries a pulley 15 driven by a belt 16 which in turn is driven by an electric motor 17. Through the upper portion of the wall of the conveyer tube is an opening 18 which communicates with an inclined downspout 19 which conveys the sugar into a small reservoir 20 immediately above the hopper 21 which is provided in its bottom with a shutter 22, which controls the flow into the weighing receptacle 23, which is provided at its bottom with a specially designed shutter 24 to control the outlet or discharge of the sugar therefrom into the spout 5 through an opening 29 in the table top 27 on which is supported the scale 26 and which in turn is supported on legs 28, 28 slightly above the top of the bin 1. In other words, the table does not come into contact with the bin, nor with any of the elements supported by the bin. As will hereinafter be explained, the mechanism for operating the hopper and shutter mechanisms is supported on the tube, which in turn is supported on the bin; while the weighing element is supported on the table; so that the independence of the two systems of supporting elements prevents the vibrations caused by operation of the shutter and conveyer elements from being transmitted to the weighing element. The conveyer passes through an opening 32 in the table top, and the opening is covered by material incapable of transmitting vibrations such as felt, or rubber, or fabric, as indicated at 33. Just above the opening 18 and through the opposite wall of the elevator tube is another opening 30, which communicates with a tube 31 which leads back down into the bin and serves as an overflow pipe and prevents packing of the sugar in the passages or jamming the conveyer or other parts in case the sugar should be elevated faster than it can be discharged into the weighing elements as hereinafter explained.

Referring now more particularly to Figs. 1, 2, 4 and 5, the base frame 26 of the scale is formed with the two posts 34, 34 on which the main scale beam 35 is supported by trunnions 37, 37, said scale beam being formed with a loop 36, 36 and with a poise beam 38 and equipped with a poise 39. The base plate of the scale frame is formed with an opening 25 which registers with the bottom opening of the weighing receptacle and with the opening 29 through the table top (see Fig. 3). Supported on trunnions 40, 40 carried by the main scale beam is the auxiliary scale beam or evener 41 which is here formed with a ring-shaped receptacle support for supporting the weighing receptacle immediately above said opening 25, the forward portion of the evener being formed into first a substantially horizontal arm 42 and thence a substantially vertical portion 45 which extends up into the fan-shaped portion 46 of the scale frame, and is connected at its upper end to a bracket 48 by means of a link 47, by means of which arrangement, the ring is maintained always in substantially horizontal position notwithstanding the slight tilting of the main scale beam. The ring is formed with grooves 44, 44 to receive the brackets 43, 43 secured to the funnel-shaped bottom of the weighing receptacle, which are then screwed firmly to the ring. The forward end of the main scale-beam is connected by means of a steel band 49 with the cam 50 secured to the indicating arm 52 and supported in the frame on trunnions 51 and provided with a counterweight 53. The indicator lever is equipped with the ordinary cord 53′ for registering the various weights and computations, and at its upper end carries a contact piece 54 adapted to make electrical contact with the contact screw 58 carried by a bracket 56 formed with a pointer 57 and with an insulated handle 59 which projects out through a slot 60 in the upper edge of the fan-like portion of the scale frame. The bracket 56 is mounted slidably on the arc-shaped rod 55 which is supported upon, though insulated from, the scale frame. One branch 131 of an electric circuit is connected with the rod 55 and through bracket 56 with the contact screw 58, and the other branch is grounded anywhere on the scale frame and therethrough connects with the contact piece 54, the parts enumerated being of metal. It will be readily understood that by setting the bracket with the indicator 57 at any desired point along the rod 55, the contact will be made when the desired weight is attained in the weighing receptacle. And it may be here stated that the purpose of making contact and closing the electric circuit is two-fold: first, to close the hopper shutters and open the weighing-receptacle shutter so that discharge from the hopper into the weighing receptacle will cease and the contents of the weighing receptacle will be discharged into the bag; and, second, to stop the elevator and positive feed mechanism. And the connections will be hereinafter explained for accomplishing these purposes.

Referring now more particularly to Figs. 3, 6 and 7: The shutter 24 for the bottom of the weighing receptacle is hinged on a rod 70 pivoted in brackets 71, 71 secured to the bottom of the can; and secured to the hinge rod is an arm 72 engaged by a roller 73 on an arm 74 secured to a rod 75 mounted in bearings 76, 76 secured to the side of the can and said rod 75 carries at its upper end an arm 75 with a roller 78. Now, it will be seen that when the shaft 75 is slightly rotated so that the arm 74 and roller 73 are in position shown in full outline in the drawings (normal position), the shutter 24 drops open by force of gravity with the arm 72 projecting upwardly. If, now, the arm 74 and roller 73 be moved to the right, to the position shown in dotted outline in Fig. 7, the arm 72, being in the path of roller 73, will be depressed to horizontal position, and the shutter will be raised to similar position, which is its closing position. On return movement of the roller and roller-arm, the force of gravity will again open the shutter. This oscillating of the shaft 75 is effected by means of the arm 77 and roller 78, as will be presently explained.

The roller 78 works in a slot 79 in the disk 80 which is mounted on a central sleeve 81 journaled in a hole 82 in the supporting plate 83 mounted on the conveyer tube by means of a band 84 and braces 85. The slot 79 extends angularly from near the center of the disk outwardly toward its periphery and thence along an arc 86 concentric with the pivot, terminating in an enlarged aperture 187. The disk is provided with an operating handle 187. Now, it will be noted by reference to Fig. 10, that upon turning the disk by means of the handle, the roller 78 is first moved away from the central portion of the disk and oscillates the shaft 75 so as to close the shutter 24 as hereinbefore explained. Upon further turning the disk, the roller merely rides in the arc-shaped portion of the slot 86 (for a purpose hereinafter explained) until the handle is in position indicated by the dotted line 122, which represents its full movement, when the roller is in the enlarged aperture 187 as shown by the dotted outlines. The purpose of this enlarged aperture is to free the roller from contact with the disk during the delicate weighing operation; and the contact between the roller and the disk being the only contact between the feeding mechanism and the weighing mechanism, it is important that the connection be absolutely free from contact so that the weighing element will not be interfered with during the weighing operation. Upon restoring the disk to initial position, the parts are restored to normal position, with the shutter again open. The disk is held closely in place by means of clips 88, 88.

The disk is also formed with another slot 89 which is first arc-shaped near the central portion of the disk and thence extends angularly outward toward the periphery, and is engaged by a roller 90 pivoted on the hopper-shutter 22 and which extends up through a slot 91 in the supporting plate 83. The shutter is supported in cleats or ways 95, 95 secured to the under side of said plate, immediately under the opening 93 from the bottom of the hopper, and is formed with an opening 92. Also supported in said ways is the auxiliary shutter 94 formed with an opening 96. For the present, the auxiliary shutter may be considered as stationary, closing one-half of the hopper opening 93, whose location is indicated by the dotted square outline in Fig. 13, which leaves one-half of the opening to be closed by the shutter 22. Now, the arc-shaped portion of the slot 89 corresponds in degrees with the angular slot 79; that is to say, on the initial turning of the disk while the shutter 24 is being opened, the roller 90 is idle in the arc-shaped portion of slot 89; and while the roller 78 is idle in slot 86 during further turning of the disk, the roller 90 is forced radially away from the central portion of the disk by reason of the engagement with the slot 89, which further movement opens the hopper shutter by bringing the opening 92 into register with the portion of the opening 93 not closed by the auxiliary shutter. In other words, the first movement of the handle 87 closes the shutter of the weighing receptacle (the hopper shutter being normally closed) and the further movement opens the hopper shutter. On returning, the first movement closes the hopper shutter, and the further and final movement opens the shutter of the weighing receptacle.

Referring to the auxiliary shutter: Pivoted to a bracket 97 on the under side of said auxiliary shutter are the two members 98 of the split-nut member which have the internally threaded portions 99 adapted for engagement with the screw-threaded portion of the shaft 100, the two members being normally compressed together by means of a spring 99', and the shaft being mounted in brackets 101, 101 depending from the supporting plate. The shaft is driven by a sheave 102 over which passes a belt 137. The shaft is constantly driven while the machine is in operation, and, in the absence of action by the devices actuating the auxiliary shutter, the split nut will ride idly on the reduced smooth portion 103 of the shaft between the threaded portion and the collar 104 with the auxiliary shutter closing one-half of the hopper opening, as shown in the drawings. The split nut is formed with a tapered opening 105 (one-half in each member), into which works the tapered or wedge-shaped member 106, the parts immediately concerned being mounted in a suitable guide-bracket 107 secured to the said shutter; and a spring 108 is provided for normally pushing the larger portion of the wedge out of the tapered opening so that normally the split nut will be closed. But by pulling on the link 109, it will be seen that the wedge will be pulled into the tapered opening and spread the split nut members apart so they will ride freely over the screw-threaded shaft without engaging the same. The link 109 is secured at one end to said wedge and at its other end to a crank arm 110 secured to the shaft 111 which is mounted within said sleeve 81. On the upper end of the shaft 111 is a collar 112 formed with a notch 113 adapted to be engaged by a pin 114 (see Fig. 11) mounted in a housing 115 on the disk. The pin is normally pressed away from engagement with said notch by a spring 116 against a back-stop 117, and is forced into engagement with said notch by pressing against the thumb-piece 118 by the hand which operates the disk handle. The auxiliary shutter is controlled by this pin. If left in normal position, the operation of the disk will not affect the auxiliary shutter, but it will remain in normal position. If, however, the operator, when grasping the disk handle and turns it also presses the pin into engagement with the notch 113, and then moves the handle, the collar 112, shaft 111 and crank arm 110 will be turned with it, causing the link 109 to be pulled to the right (viewed in the drawings), which has the effect, first of opening the split nut, and second of pulling the auxiliary shutter to the right thereby bringing the opening 96 into full register with the hopper opening 93, and causing the split nut to be pulled along to the right over the screw-threaded shaft. Immediately upon releasing the pin from the notch 113, the spring 108 forces the wedge back and the split nut members close on the screw-threaded shaft which thereupon by its continuous movement drives the auxiliary shutter back to its closed and normal position as shown in the full outlines. The purpose of this shutter is to provide for a stream of larger volume with a positive time closing mechanism driven by the motor, so that by releasing the pin from the notch at any given point, the larger stream will be gradually diminished before sufficient sugar has entered the weighing receptacle to reach the desired quantity therein, leaving the delicate balancing of the scale to be effected only under the smaller and normal stream furnished by the main hopper shutter.

Secured to the sleeve 81 is a sheave 119 to which is secured one end of a spring 120, the other end of which may be secured to the under side of the supporting plate. The purpose of this spring is to restore the disk to normal position where it is held by reason of the engagement of the stop 148 against the side of the supporting plate. The disk is formed with a notch 121 so located that when the disk has reached its maximum movement with the handle on line 122, it will be engaged by a detent 123 pivoted to the supporting plate and actuated by a spring 124 and held in locking engagement with said notch by engagement back of the tooth 125 of the lever 126 carrying an armature 127 and pivoted at 128, said armature being influenced to lift the lever and tooth by the electromagnet 129 secured to bracket 130. The electromagnet is connected by wires 131 and 131', with the rod 55 (see Fig. 2 and Fig. 1) and with the scale frame, a local battery furnishing the current. Now, it will be understood that upon turning the disk to the position indicated by the line 122, the detent will hold it there; then by closing the contacts 54—56, the detent will be released and the parts will automatically be restored to normal position.

Within the hopper 21 is a drum 132 carrying a number of stakes or spokes 133, the drum being mounted on a shaft 134 carrying a sheave 135 and mounted in the sides of the hopper and in the bracket 136 and carrying also a sheave 138. The shaft being driven by the belt 142, in turn drives the shaft 100 (which closes the auxiliary shutter) through the belt 137 which passes over the idle pulley 140 mounted on bracket 141 secured to the supporting plate, the latter belt passing through a hole 139 through the supporting plate. The belt 142 passes over the guide pulleys 142' mounted on the bracket 143 and thence around the sheave 144 by which it is driven, said sheave being secured on the shaft 145 mounted in a bearing bracket 146 secured on said bracket 143, and said shaft also carrying the large gear 146 meshing with the pinion 13 of the conveyer hereinbefore described; so that it will be understood that the rotation of the spiral conveyer drives the agitator in the hopper and also the auxiliary shutter. The purpose of the agitator is to prevent caking and packing of the commodity in the hopper and, more importantly, to afford a uniform rate of feed from the hopper into the weighing receptacle, so that the weight and impact of the stream cut off by the closing of the shutter or shutters will always be exactly the same, in order that by calculation or tests, the indicator card used on the scale may be adjusted slightly in advance of the actual attained weight with the assurance of uniform accuracy in weight.

The motor 17 is driven from any suitable source of electric current supply, and one branch of the circuit (not shown) passes through a switch which is automatically controlled by the disk 80 in such manner that the switch is normally open leaving the motor and all parts at rest in their normal positions as shown in the full outlines in the drawings, that upon manually shifting the disk by shifting the handle to the position 122 the switch is closed thereby rotating the conveyer and agitator and auxiliary shutter shaft, and that upon restoration of the disk to normal position, again opens the switch and stops the operation of those parts. Such switch arrangement is shown in Figs. 10, 15 and 19. 147 is a rod slidably mounted on the under side of the supporting plate and retained in place by a cleat 150 and formed with an offset 151 which bears against the end of the rod 152 slidably mounted in the two brackets 101, 101 and which bears at its other end against the insulated tip 153 of the spring contact member 154, these parts normally holding said spring contact away from the other contact member 155 against the tension of the spring 154 by reason of the engagement of the lug 148 against the end of the rod 149, as shown in Fig. 19 and in Fig. 10. Upon shifting the disk, as hereinbefore described, the lug is carried away from said rod, and the spring 154 forces itself against the contact member 155, making a closed circuit through the motor, and at the same time forces the rod 149 slightly outwardly into the path of said lug, so that on return movement of the disk the lug will again strike against the end of said rod and open said switch. The wiring for the motor is connected through the binding posts 156 conveniently arranged on top of the supporting plate and connecting respectively with the two contact members. A switch tongue 157 is also provided manually operated by a conveniently arranged handle 158 for permanently closing the circuit through said switch, as in case of its being desired to use the machine for weighing similar amounts in rapid succession.

Having described the various details involved in the construction of a machine embodying my invention and the operation of the several elements, I will now describe the operation of the machine as a whole, chiefly from the user's viewpoint. The parts being in normal position as shown in the full outlines and the bin containing a supply of sugar which freely flows into the elevator tube, the user places a bag on whichever of the shelves 6 is the most convenient; he then adjusts the contact bracket member 56 so that the pointer 57 indicates the weight of sugar which he desires to fill into the bag and he then (taking no account for the present of the auxiliary shutter) grasps the handle 87 and pulls it around to the position 122 where it is held by the detent 123. Such shifting of the handle completes the attention which the user gives the machine, as the machine automatically does the rest. The shifting of the handle starts the driving motor, which operates the conveyer which elevates the sugar in the tube, the sugar flowing through spout 19 and hopper opening 92 of shutter 22, and into the weighing receptacle whose shutter is closed. This operation continues until the strip 54 contacts with contact 58, when, by reason of the releasing of the detent 123, the disk is returned to normal position, the driving motor and parts driven thereby are stopped, the shutter 22 is closed cutting off the stream, and the shutter 24 is opened, permitting the sugar to flow down out of the weighing can, through the spout 5, into the bag; and the scale upon being relieved of the load is also restored to normal position. The parts are therefore all in readiness for the next operation. If the next desired quantity is the same, all the user need to do is to place his bag on the shelf and pull the handle 87; if he desires a different weight, then he also shifts the contact member 56 accordingly. Where a large quantity is to be weighed, the auxiliary shutter is brought into operation in order to expedite the flow through the hopper; and to do this, the user simply presses inwardly against the thumb-piece 118 to cause the pin 114 to engage in notch 113 to carry the shaft 111 around with the disk either all the way, or part way. For the largest quantity the shaft will be carried all the way; and the machine will be so adjusted that by the time the auxiliary shutter is closed a quantity just short of the final desired weight will be attained in the weighing can, it being important that the final delicate balancing operation shall be under influence only of the regular normal stream controlled by the main shutter 22. And thus it will be noted that for a lesser quantity, the thumb-piece 118 should be released when only part way around, so that the opening by the auxiliary shutter will not be so large and the time required for its closing will be correspondingly less.

Referring to the modified form of weighing receptacle shown in Figs. 20 and 21: The purpose of this form is to provide a means for cutting off a stream of uniform length in any of a limited number of different weights. This is particularly applicable to retailing sugar where the quantities sold are almost universally 25¢, 50¢, and $1.00 worth. The main exterior body of the can 23 is the same as that hereinbefore described and its relation to the other parts of the machine is identical. Concentrically supported within the main body are the two telescopic tubes 160 and 161, each comprising a lower member 162 rigidly supported by means of the braces 163 which are very thin in order not to interfere with the free flow of the sugar, and an upper member 164 fitting frictionally tight over the lower member but movable up and down thereon so as to lengthen or shorten the length of each tube. Both tubes are open both at the top and at the bottom. The sugar from the hopper flows into the inner and smaller tube, which is adapted for the smaller quantity, say 25¢ worth. The sugar spreads over the bottom of the can but will not flow upward into the compartments between the two tubes or between the outer tube and the wall of the can; and the inner tube will be so adjusted approximately that the desired weight will be attained when the inner tube is full, so that the stream cut off by the automatic operation of the scale mechanism reaches from the hopper shutter to the top of the can, approximately. If the next quantity be desired, say 50¢ worth, the continued flow will cause the sugar to overflow the inner tube and fill the compartment between the two tubes, and the stream will be cut off with a substantially similar length. If the largest quantity be desired, the further operation will cause the sugar to overflow into the outer compartment, and a stream of substantially similar length will be cut off. Of course, the measure by volume is approximate only; but the arrangement makes it possible to adjust the machine for cutting off streams of substantially similar length for the given quantities, the weighing being done delicately by the scale as hereinbefore described.

Having thus described my invention, what I claim is:

1. In automatic weighing machines, the combination of a bin, a scale for weighing the commodity, a support for said scale spaced apart from the bin, a hopper adapted to discharge into the scale, an elevator supported on the bin independently of the scale and scale support, and automatic mechanism for controlling and operating the elevator and the shutters supported on the elevator, said spacing apart being so arranged that the vibrations caused by the operation of said mechanisms are not transmitted to the scale.

2. In automatic weighing machines, the combination with a bin, a weighing element supported above the bin, and a hopper for discharging into the weighing element; of an elevator for raising the commodity from the bin to the hopper comprising a vertically disposed tube set up in the bin with openings at the bottom of the bin, and a spiral conveyer with said tube spaced apart slightly from the wall of the tube and having flights of moderate incline, approximately 15 degrees at their periphery to the horizontal, so that sugar will not run back down the spiral when the spiral is at rest; together with means for rotating the spiral and a passage from the tube to the hopper.

3. In automatic weighing machines of the type described adapted especially for sugar and having a bin and a weighing element above the bin, an elevator for raising the sugar from the bin to the weighing element comprising a vertical tube and a spiral within said tube having flights having an incline at their periphery of approximately 15 degrees.

4. In automatic weighing machines of the type described adapted especially for sugar, an elevator comprising a tube and a spiral conveyer therein spaced slightly apart from the wall of the tube and its flights having a moderate incline to the horizontal so that the sugar will not run back down the spiral when the spiral is at rest.

5. In automatic weighing machines, the combination of a weighing receptacle having a funnel-shaped bottom with an opening at the extreme bottom, a shutter for said opening hinged to said bottom on a horizontal hinge and adapted to swing upwardly against said bottom to close said opening and also adapted to swing downwardly by gravity to open said opening, means for raising said shutter to its closing position and maintaining it there, and automatic means for withdrawing said raising and maintaining means therefrom.

6. In automatic weighing machines, the combination of a weighing receptacle having a funnel-shaped bottom with an opening through the extreme bottom, a shutter for said opening hinged to the bottom on a horizontal hinge and said hinge also being formed with a tail piece projecting radially therefrom, a shaft mounted on said receptacle, an arm extending radially from the shaft, and a roller carried by said arm, said roller being adapted to engage said tail-piece to close said shutter and maintain it in closed position, and said shutter being adapted on withdrawal of said roller to swing downward to open position.

7. In automatic weighing machines, the combination of a scale frame having an opening through its base portion, a main scale beam fulcrumed thereon and formed with a loop above and around said opening, an auxiliary beam or evener fulcrumed on the main beam and formed with a ring above and around said opening, and a weighing receptacle supported on said ring and having a funnel shaped bottom with a discharge opening therethrough registering with said opening through said base portion.

8. In automatic weighing machines, the combination of a scale frame having an opening through its base portion, a main scale beam fulcrumed on said frame and formed with a loop above said opening, an auxiliary beam or evener fulcrumed on the main beam and formed with a ring above said opening, and a weighing receptacle mounted on said ring and formed with a funnel-shaped bottom depending through said ring and loop and having a discharge opening registering with the first-named opening.

9. In automatic weighing machines, the combination of a springless scale having a weighing receptacle and an oscillating indicator arm, said receptacle having a funnel-shaped bottom with a discharge opening therethrough, a shutter for said opening a hopper adapted to discharge into said receptacle and a shutter for said hopper, means for closing the first-named shutter and for opening the second-named shutter in sequence, a latch for holding said means with the first-named shutter closed and the second-named shutter open, an electromagnet for controlling said latch, an electrical contact adjustably supported on the frame and a complementary contact carried by said arm, the first named contact being in the path of the second-named contact, and an electric circuit connecting said electromagnet with said contacts and controlled thereby whereby the latch is controlled by said indicator arm.

10. In automatic weighing machines, the combination of a springless scale having a weighing receptacle and an oscillating indicator member, said receptacle having a discharge opening through its bottom, a shutter for said opening, a hopper adapted to discharge into said receptacle and a shutter for said hopper, means for closing the first-named shutter and opening the second-named shutter, and means for automatically restoring said shutters to initial position, a latch for holding the shutters in first-named position, electromechanical means for controlling said latch including an electric circuit, a contact in said circuit controlled by the indicator member and a complementary contact in said circuit manually adjustable.

11. In automatic weighing machines, the combination of a springless scale having a weighing receptacle and an indicator member, said receptacle having a discharge opening, a shutter for said opening, a hopper adapted to discharge into said receptacle and a shutter for the hopper, means for closing the first-named shutter and opening the second-named shutter, means for automatically restoring the shutters to initial position, a latch for holding the shutters in first-named position, electro-mechanical means for controlling the latch including an electric circuit, a contact in said circuit controlled by the indicator member, and a complementary contact manually adjustable on the scale frame.

12. In automatic weighing machines, the combination of a springless scale having a weighing receptacle and an indicator member, said receptacle having a discharge opening, a shutter for said opening, a hopper adapted to discharge into said receptacle and a shutter for the hopper, means for closing said first-named shutter and opening the second-named shutter, means for automatically restoring the shutters to first-named position, a latch for holding the shutters in first-named position, electro-mechanical means for controlling the latch and including an electric circuit adjustably controlled by the indicator member.

13. In automatic weighing machines, the combination of a weighing element having a weighing receptacle, a hopper adapted to discharge into said receptacle, a shutter for said hopper slidably mounted thereunder, a shaft supported on the receptacle and formed with an arm adapted to engage and close the receptacle shutter and also formed with a crank arm for oscillating it, and a disk formed with slots for engaging said crank arm and said hopper shutter for operating the same.

14. In automatic weighing machines, the combination of a frame, a scale supported thereon, another frame and a hopper supported thereon, shutters for the scale receptacle and for the hopper, a crank arm for operating the receptacle shutter, and a disk pivoted on the second-named frame and formed with slots engaging and operating said crank arm and said hopper shutter.

15. In automatic weighing machines, the combination of a frame, a hopper supported thereon, a sliding shutter for the hopper, means for operating said shutter, an auxiliary slidable shutter for said hopper, a motor, means for opening the auxiliary shutter, and connections between the motor and the auxiliary shutter for positively driving said shutter from open to closed position.

16. In automatic weighing machines, the combination of a frame, a hopper supported thereon, a shutter for the hopper, means for opening the shutter, and a motor for positively driving the shutter from open to closed position.

17. In automatic weighing machines, the combination of a frame, a hopper supported thereon, a shutter for the hopper, means for opening the shutter various distances, a motor, and means connecting said motor with said shutter whereby said shutter is positively driven from any open position to closed position.

18. In automatic weighing machines, the combination of a frame, a hopper supported thereon, a sliding shutter for said hopper, a screw-threaded shaft mounted on the frame parallel with said shutter and adjacent thereto, a split nut secured to the shutter and adapted to engage said shaft, means for opening the shutter and spreading the nut members apart during the opening movement and for clamping them on said shaft at the end of such movement, and a motor for driving said shaft, said shaft driving said shutter from open to closed position by reason of engagement with said split nut.

19. In automatic weighing machines, the combination of a weighing element having an indicator arm and a weighing receptacle, a hopper above the weighing receptacle and adapted to discharge thereinto, a bin below the weighing element, an elevator adapted to raise the commodity from the bin to the hopper, a shutter for the weighing receptacle and a shutter for the hopper, means for actuating said shutters, an auxiliary shutter for the hopper and means for opening the same, and a motor for driving said elevator and for positively closing said auxiliary shutter.

In testimony whereof I have hereunto affixed my signature.

CHARLES D. SCOTT.

Copies of this patent may be obtained for five cents each, by addressing the "Commissioner of Patents, Washington, D. C."